(No Model.) 2 Sheets—Sheet 2.

A. G. WATERHOUSE.
INSTRUMENT FOR MEASURING ELECTRIC CURRENTS.

No. 393,088. Patented Nov. 20, 1888.

WITNESSES:
David W. Brown
J. J. Carroll

INVENTOR,
Addison G. Waterhouse
BY
Geo. H. Benjamin
ATTORNEY.

UNITED STATES PATENT OFFICE.

ADDISON G. WATERHOUSE, OF HARTFORD, CONNECTICUT.

INSTRUMENT FOR MEASURING ELECTRIC CURRENTS.

SPECIFICATION forming part of Letters Patent No. 393,088, dated November 20, 1888.

Application filed August 20, 1887. Serial No. 247,403. (No model.)

*To all whom it may concern:*

Be it known that I, ADDISON G. WATERHOUSE, of the city of Hartford, in the State of Connecticut, have invented certain new and useful Improvements in Instruments for Measuring Electric Currents, of which the following is a specification.

My invention relates to instruments for measuring electric currents transmitted through them, and of the class known as "am" and "volt" meters, the first-named instrument having for its object to measure the quantity of the current and the second the electro-motive force of the current.

The object of my invention is to produce an instrument which will be sensitive to variations of the current transmitted through it, and which will invariably indicate such changes at all times and under all conditions.

It is a well-known fact that with electrical measuring-instruments of the class commonly employed, and which depend for their action upon a permanent magnet or utilize a coiled spring in their construction, the magnetism of the magnet, as well as the resiliency of the spring, is a varying quantity, and hence such instruments are unreliable and must be calibrated by some standard before being put into use. Again, such instruments are more or less frail and are not suited to the rough usage of station-work.

In order to overcome the objections stated, I have devised the apparatus which I will now proceed to describe.

In the accompanying drawings, which illustrate my invention, similar letters of reference indicate like parts.

Figure 1:
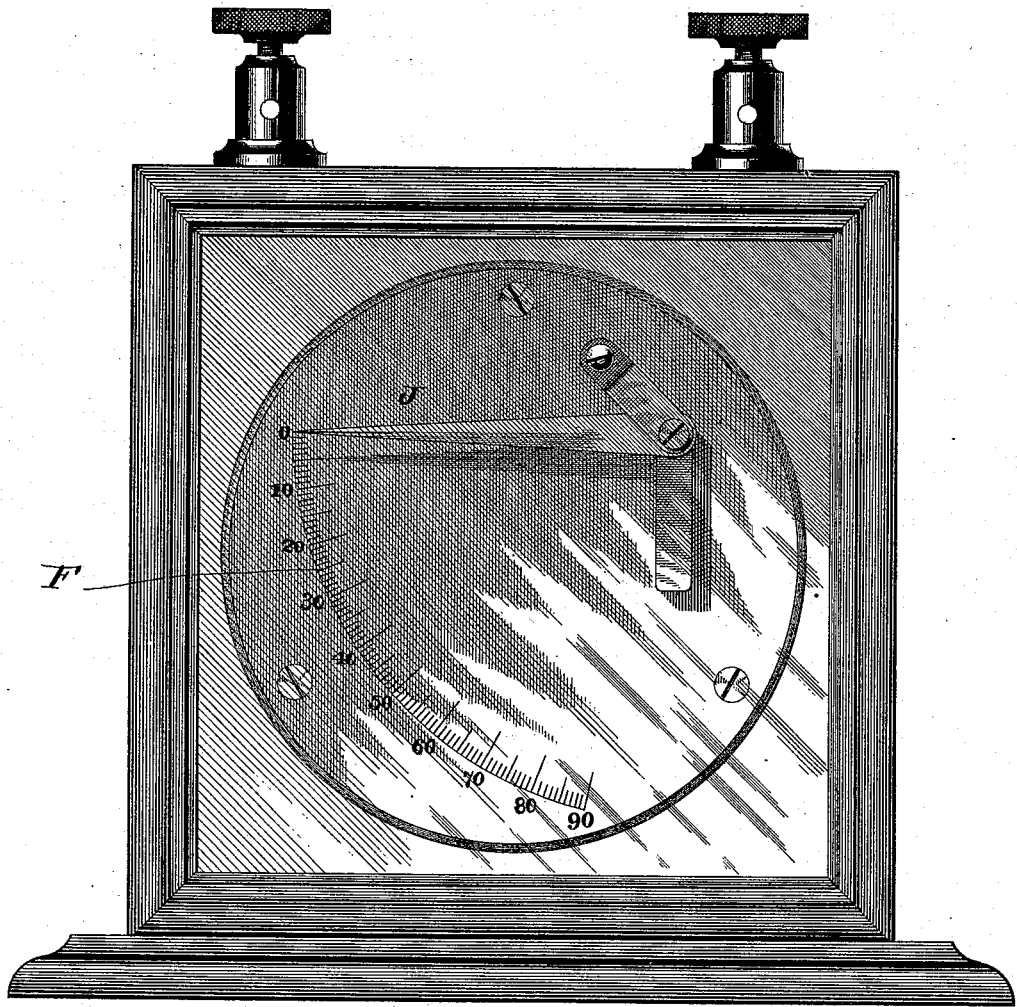
Figure 2:
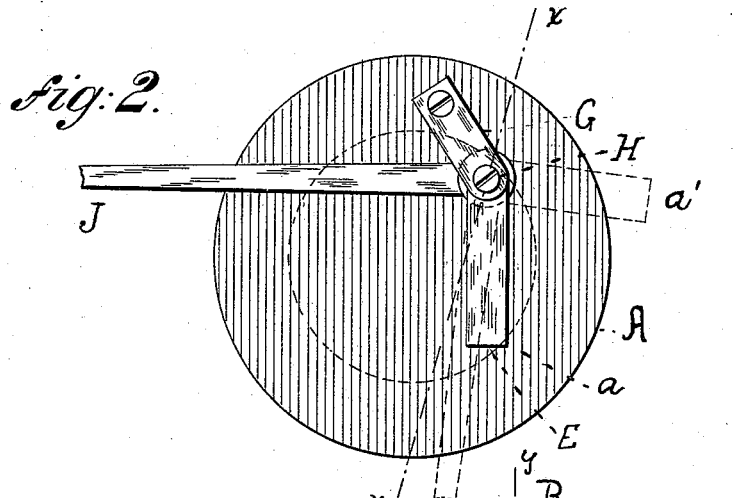
Figure 3:
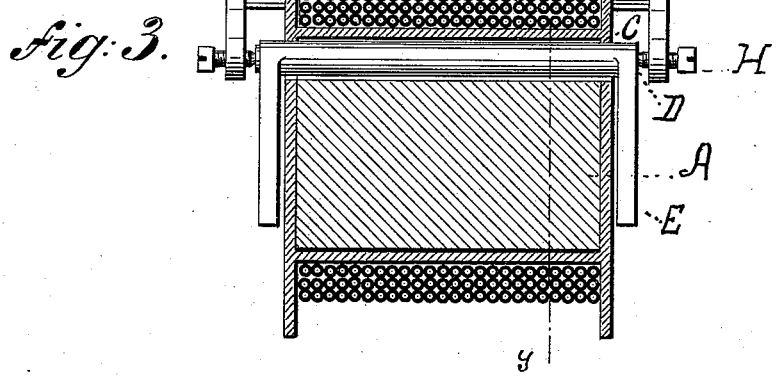
Figure 4:
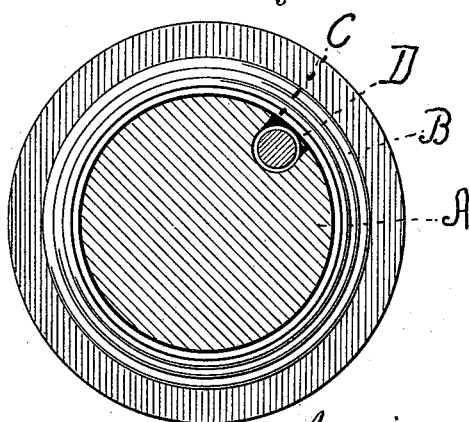

Figure 1 is a front elevation of an electrical measuring-instrument arranged according to my invention and shows the indicating-dial and pointer. Fig. 2 is an end face view of the electro-magnet and pointer used in my device. Fig. 3 is a longitudinal section on the line X X of Fig. 2, the armature being shown in elevation. Fig. 4 is a transverse vertical section on the line Y Y of Fig. 3.

In the drawings, A indicates an electro-magnet made from soft iron, which may be of any desired shape—preferably cylindrical or spool-shaped—and around which is wound a helix, B, of suitable wire. A tubular orifice, C, is made through the core of the magnet and situated just to the left of the upper portion of its periphery. Located within the tubular orifice C is an armature, D, which consists of the cylindrical portion D, one or more dependent end portions, E E, at right angles to the cylindrical portion, and the pointer J, which sweeps over the scale F of the instrument. The armature, its dependent portion or portions, and pointer may be formed of soft iron in one piece or of several pieces and suitably secured together.

The armature D is supported so as to move freely by means of the brackets G, suitably secured to the core, and the cone-pointed adjustable screws H. The dependent portion or portions E of the armature are at right angles to the pointer J, which is the lightest. Hence when no current is passing through the instrument the pointer assumes the position indicated at $a$, Fig. 2, which is that of 0 on the indicating-scale.

When a current is transmitted through the instrument, the dependent portions E of the armature, by reason of their allowing an opposite polarity to the ends of the magnet near which they are placed, are rotated across the faces of the magnet, and the pointer J, which is preferably made of some light non-magnetic metal, follows their movement, as shown at $a'$.

The location of the armature to one side of the median line of the magnet is for the purpose of giving the pointer a long sweep with a comparatively small dial; but I do not limit myself to such location.

The degree of movement of the pointer across the scale will be approximately proportional to the current transmitted through the instrument. In practice the scale may be prepared by calibration with well-known standard instruments.

I claim as my invention—

1. A current-measuring device comprising an electro-magnet having a tubular orifice in the periphery of its core, an armature located in such orifice provided with one or more angular extensions, an indicating-pointer connected to one end of said armature, and a scale over which the pointer sweeps, substantially as described.

2. The combination, in a current-measuring device, of the magnet A, provided with tubular orifice C, armature D, having the rectangular extensions E E, brackets G, and adjustable screws H, for supporting the armature, substantially as described.

3. A current-measuring device comprising an electro-magnet, a fixed core therefor, a movable core or armature provided with dependent portions which overlie the ends of the fixed core, and a helix including both cores, substantially as described.

In witness whereof I have hereunto set my hand this 17th day of August, 1887.

ADDISON G. WATERHOUSE.

Witnesses:
GEO. H. BENJAMIN,
CHAS. E. CHAPIN.